(12) United States Patent  
Matson

(10) Patent No.: US 8,702,849 B2
(45) Date of Patent: Apr. 22, 2014

(54) DUST SCREEN AND METHOD FOR DRY BULK STORAGE UNITS

(75) Inventor: Mark Matson, Fort Worth, TX (US)

(73) Assignee: Matson, Inc., Fort Worth, TX (US)

( * ) Notice: Subject to any disclaimer, the term of this patent is extended or adjusted under 35 U.S.C. 154(b) by 57 days.

(21) Appl. No.: 13/477,707

(22) Filed: May 22, 2012

(65) Prior Publication Data

US 2012/0304860 A1 Dec. 6, 2012

Related U.S. Application Data

(60) Provisional application No. 61/493,154, filed on Jun. 3, 2011.

(51) Int. Cl.
*B01D 46/02* (2006.01)

(52) U.S. Cl.
USPC .............. 95/273; 55/341.2; 55/356; 55/361; 55/374; 55/378; 55/379; 55/381

(58) Field of Classification Search
USPC ........... 55/283, 299, 300, 304, 379, 380, 490, 55/501, 511, 529, 492, 305, 293, 295, 286, 55/288; 95/279, 282; 137/41, 547; 210/342, 417, 451, 455, 489, 498, 104, 210/106, 121, 356, 409, 416.1, 437; 406/39, 41, 89
See application file for complete search history.

(56) References Cited

U.S. PATENT DOCUMENTS

| | | | |
|---|---|---|---|
| 2,897,915 A | 8/1959 | Hastrup | |
| 3,480,330 A | 11/1969 | Hirs et al. | |
| 4,017,281 A | 4/1977 | Johnstone | |
| 4,264,345 A | 4/1981 | Miller | |
| 4,433,987 A | 2/1984 | Lenox | |
| 4,435,197 A | 3/1984 | Nijhawan et al. | |
| 4,452,617 A | 6/1984 | O'Dell | |
| 4,759,781 A | 7/1988 | Olson | |
| 5,053,063 A | 10/1991 | Sisk | |
| 5,067,856 A * | 11/1991 | Sisk | 406/41 |
| 5,507,859 A | 4/1996 | Kaiser | |
| 5,755,962 A | 5/1998 | Gershenson et al. | |
| 6,875,248 B1 * | 4/2005 | Shelton et al. | 55/356 |
| 7,833,318 B2 * | 11/2010 | Snowdon | 95/273 |

(Continued)

OTHER PUBLICATIONS

Collecting & Filtering Dust, product pamphlet, pp. 1-9, American Fabric Filter Co., copyright 2003.

*Primary Examiner* — Duane Smith
*Assistant Examiner* — Minh-Chau Pham
(74) *Attorney, Agent, or Firm* — Whitaker Chalk Swindle & Schwartz PLLC; Stephen S. Mosher

(57) ABSTRACT

A dust screen for an inspection hatch disposed in the roof or a side wall of a dry bulk storage unit for use during pneumatic loading of aggregate material from a pneumatic trailer via air pressure ducted into the bulk storage unit. The dust screen includes an elastic cord in a hem surrounding an open end of the screen to secure the dust screen to the inspection hatch. An alternative embodiment may include a binding strap having a ratchet buckle to supplement the elastic cord. As the dust screen extends upward in the presence of said air pressure, the dust is allowed to settle into the storage unit. No separate container to contain the dust is required, and no separate structure is required to support the dust screen during operation. The dust screen is light weight, portable and reusable, and low in cost.

16 Claims, 6 Drawing Sheets

(56) References Cited

U.S. PATENT DOCUMENTS

| | | | |
|---|---|---|---|
| 8,110,025 B1 * | 2/2012 | Schwaiger | 95/268 |
| 8,529,661 B2 * | 9/2013 | Diebold et al. | 95/20 |
| 2007/0017859 A1 * | 1/2007 | Diebold et al. | 210/170.01 |
| 2009/0025348 A1 * | 1/2009 | Cheng | 55/385.1 |
| 2010/0229512 A1 | 9/2010 | Howard | |
| 2011/0120312 A1 * | 5/2011 | Diebold et al. | 95/282 |

* cited by examiner

DUST SCREEN AND METHOD FOR DRY BULK STORAGE UNITS

RELATED APPLICATION

This Application claims priority to U.S. Provisional Patent Application Ser. No. 61/493,154 filed Jun. 3, 2011 and entitled DUST FILTER SOCK FOR DRY BULK STORAGE UNITS.

BACKGROUND OF THE INVENTION

1. Field of the Invention

The present invention generally relates to air filter devices and more particularly to fabric air screens or filters covering exhaust air ducts or ports or hatches in storage containers for storing aggregate materials.

2. Background of the Invention

Dry bulk storage bins or units are used on oil and gas drilling sites to store dry bulk aggregate such as frac sand. The aggregate—generally silica sand or $SiO_2$—is typically loaded into the storage bins from pneumatic trailers used to transport the aggregate to the drilling site. When transferring the aggregate to the storage bins, inspection hatches in the ceiling or wall of the storage bin may be routinely left open during the loading process to exhaust the air used to transport the aggregate from the pneumatic trailer to the storage unit. This aggregate is frequently accompanied by substantial amounts of silica dust that may be released to the atmosphere through the inspection hatches as the aggregate is transferred between containers. Release of the silica dust into the air can be a significant problem, not only in environmentally sensitive areas but also because silica dust can be a contributor to lung disease. Reducing exposure to the silica dust, can potentially and materially reduce the hazard.

Conventional dust filtering or collection devices and methods are disclosed in the prior art for use in vacuum cleaning, air filtering, and dust collecting systems. Vacuum cleaners typically pull air or gases laden with particulate matter through a porous bag used to collect the particulate matter and contain it therein for later disposal. Ventilation systems place an air filter element in the active, i.e., inlet air path, usually positioned at an inlet to the system. Household HVAC systems are one example of this type of ventilation system. In other systems air from a dust-producing environment is passed through an air filter element placed in an air outlet as the air circulating through that environment is exhausted, similar to a typical vacuum cleaner. The filter element in such ventilation systems must typically be replaced or removed frequently for cleaning to dispose of the dust retained by the filter element. The foregoing systems have the common feature that the dust is collected so that it can be removed and disposed as waste.

Industrial systems for removing dust, a relatively lightweight, low density substance, such as found in manufacturing and material processing plants use so-called "bag houses," typically configured as housings suspended over a dust-collecting hopper or other container. These housings typically contain a plurality of bag-type or pleated paper filter elements to provide a large amount of filtering surface area within a limited space. In operation, dust-laden air is conveyed into the housing which separates the dust from the air via the plurality of filter elements wherein the air is conveyed horizontally or downwardly through these elements and the dust particles deposited in the bag or in the filter element, or in a separate container such as a hopper or bin below the filter element. However, such apparatus tends to be complex and expensive, requires substantial maintenance to clean or replace the plurality of elements, and often is built into the facilities or vehicles or machinery used to process, transport, store, and convey aggregate matter from one place to another. Other examples include dust-collecting bags suspended from horizontally oriented ports. These have the disadvantage that the bags tend to fill up with the particulate matter the bags are intended to separate from the air flow, requiring frequent replacement, emptying, or back flow systems to maintain full air flow through the apparatus. Here again, the dust is collected in a filter or container that must be removed so that the collected dust can be discarded. Moreover, such filtering apparatus is generally not readily adaptable to equipment used in oil and gas drilling operations and the like without substantial modification.

As is well-known, the equipment used during drilling for oil and gas is designed to be mobile so that it can be moved from site to site. In the relatively new field of hydraulic fracturing technology currently in widespread use in such activities, water mixed with sand and certain chemicals is injected under very high pressure into drilled well passages deep into rock strata bearing deposits of petroleum hydrocarbons. This 'fracing fluid" is used to fracture the rock and support the cracks created by the fracturing with the particles of sand or ceramic beads (called "propants") in an open position to enable release of the hydrocarbons bound within the rock strata. The handling of the frac sand on site to be mixed with the water creates a need for a method and apparatus for handling these materials without releasing into the atmosphere the silica dust or other fine particulate matter that accompanies the frac sand while conveying it from transport vehicles to storage facilities at the drilling site.

The facilities at a drilling site for storing the frac sand aggregate are typically portable enclosures that have an inlet port in the side of the enclosure and an inspection hatch in the ceiling of the enclosure. Some enclosures have multiple compartments and inspection hatches. In use, a conveyor duct is connected from the discharge port of the transport vehicle to an inlet of the storage facility or unit. The aggregate, introduced into the duct from the transport vehicle, is conveyed through the duct in a high-velocity air stream produced by a high capacity air pump. The high capacity is required to transfer substantial quantities of the relatively heavy frac sand though duct work and into a storage unit. Substantial volumes of air laden with the heavy aggregate sand is thus conveyed into the compartments of the storage units. This high velocity air stream is provided under high pressure by the high capacity air pump disposed at the air inlet to the conveyor duct and into the compartment (s) of the storage unit. The inspection hatches of the storage facility are typically left open during the transfer operation to prevent the build up of back pressure in the conveyor system, which back pressure would cause poor efficiency and lengthen the time to the transfer of the sand into the storage facility. The problem created with this practice is that substantial amounts of silica dust is exhausted into the atmosphere along with the air used to convey the sand, causing undesirable dust pollution, loss of some of the sand available for use in the fracing process, and potentially creating a health hazard. The conventional systems described above for removing dust from a work area described above are either not readily adapted to the mobile equipment generally used at drilling sites or are generally complex and expensive, made more so when it is attempted to adapt them to mobile equipment.

What is needed is a simple device or method for screening, filtering or otherwise preventing the release of the dust suspended in the air stream while loading heavy or dense aggregate materials into storage bins or otherwise when transferring such aggregate materials by pneumatic means from one location to another. The device or method must be low in cost, portable, and readily suited to the mobile equipment in use at such mobile drilling facilities.

SUMMARY OF THE INVENTION

Accordingly, there is provided a dust screen apparatus and method for use with a dry bulk storage unit having at least one inspection hatch useable for inspection during filling the storage unit from pneumatic trailers. The dust screen comprises an elongated bag formed of a fabric having a predetermined air permeability and having an open end; a hem disposed surrounding the open end of the elongated bag; an elastic band disposed within the hem urges closure of the open end of the elongated bag around the inspection hatch. A binding strap having a ratchet buckle attached to the bag along the said hem around the open end of the elongated bag may be used for securing the open end of the elongated bag around the inspection hatch.

In one embodiment, a dust screen for a topside inspection hatch of a dry bulk storage unit is provided for use during pneumatic transfer of frac sand from a transport vehicle via an active air stream inlet to the storage unit. The invention comprises a bag open at a first end and formed of a low density twill fabric having a rated air permeability between 15 and 35 CFM; the bag further having a net surface area in square feet exceeding the ratio of the pneumatic capacity of the transport vehicle in CFM to the rated air permeability of the dust screen in CFM; and an elastic band disposed within a sewn hem surrounding the open first end of the bag to attach the open end of the elongated bag around and in contact with a rim of the inspection hatch; wherein the dust screen, installed over the topside inspection hatch, is configured to inflate upward from the hatch to expose the full area of the dust screen to air exhausting from the hatch while retaining air-borne dust particles within the dust screen such that they settle into the storage unit, and wherein no separate container is required to collect the dust particles. Moreover, no separate structure is required to support the dust screen in the vertical upward orientation from the inspection hatch during operation.

In another embodiment, a method is provided for retaining air-borne dust within a bulk storage unit for aggregate material during pneumatic transfer of the aggregate into the storage unit at an inlet of the storage unit defined as an active air path. The method comprises the steps of configuring an inspection hatch disposed in a ceiling of the storage unit as a passive path for exhaust air flow; forming a dust screen as an elongated bag formed of a low density twill fabric having a rated air permeability between 15 and 35 CFM and having a net surface area in square feet exceeding the ratio of the pneumatic capacity of the transport vehicle in CFM to the rated air permeability of the dust screen in CFM; providing the dust screen with an open first end surrounded by an elastic hem; attaching the dust screen over the inspection hatch using the elastic hem; exhausting the pneumatic air flow upward through the inspection hatch and the dust screen; and depositing the particles of air-borne dust retained within the dust screen into the bulk storage unit. Moreover, no separate structure is required to support the dust screen in the vertical upward orientation from the inspection hatch during operation.

Other aspects of the invention will become apparent in the detailed description, read in conjunction with the drawings affixed hereto.

DETAILED DESCRIPTION OF THE INVENTION

Introduction

Figure 1:
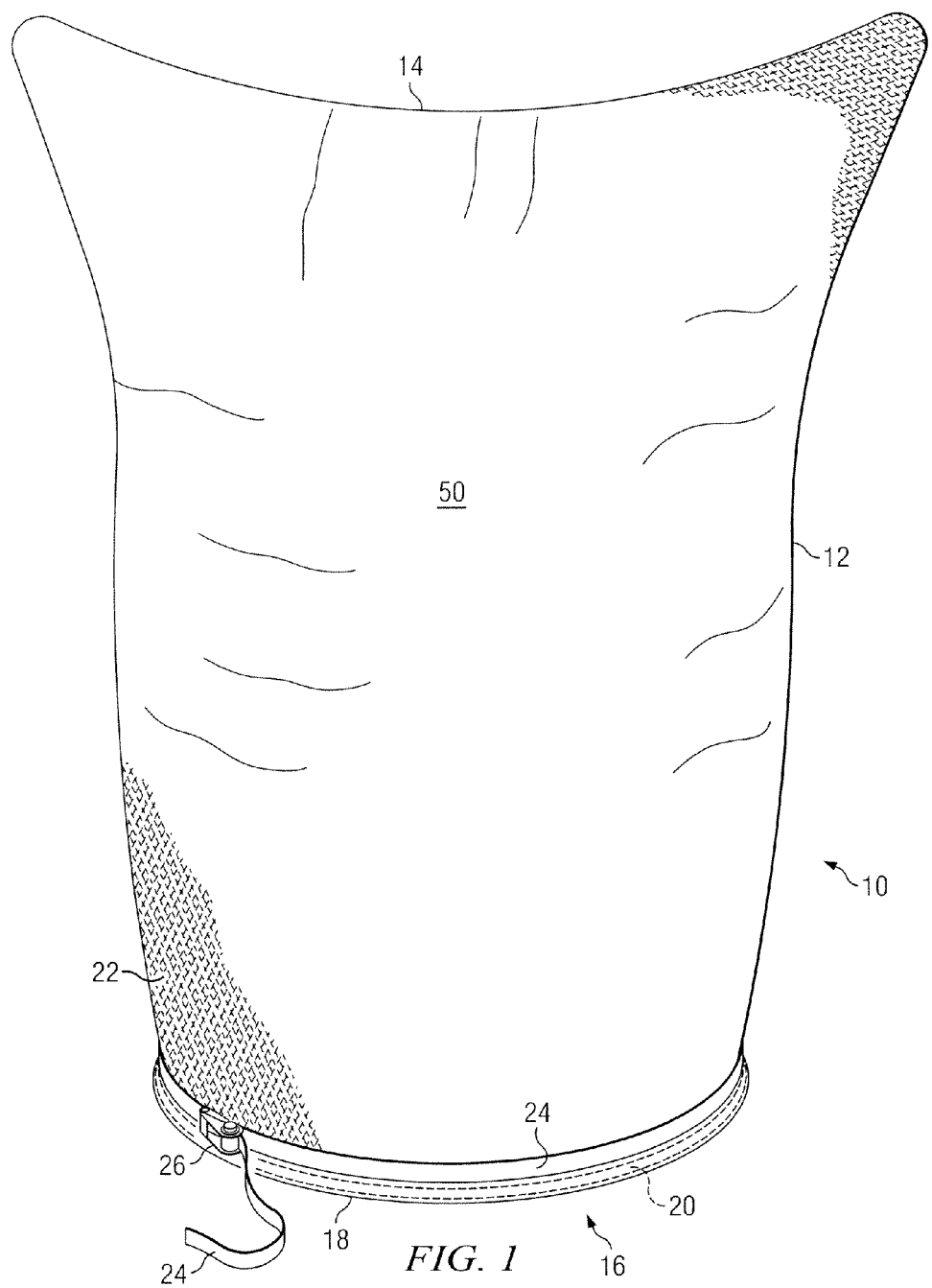
FIG. 1 illustrates one embodiment of a dust screen attachment according to the present invention.

The inventor pondered whether several conditions unique to mobile oil and gas drilling operations could be used to advantage in solving the problem of containing the dust associated with conveying aggregate materials such as frac sand from the pneumatic transport vehicles to the storage enclosures at the drilling sites. One such condition is the use of the high velocity air stream used to convey the heavy aggregate from the transport vehicle into the storage enclosure. Another condition is the fact that the storage enclosures have inspection hatches in the ceiling or top of the enclosures. The inspection hatches serve two purposes: allowing for inspection of the contents, and allowing for the venting of the exhaust air used to convey the aggregate into the enclosure. A way was sought to utilize the combination of the top-side inspection hatch or air vent and the high velocity of the air stream to provide a practical device that could trap the dust particles within the enclosure while allowing the exhaust air to be directed upward and out of the enclosure.

It is known that to be efficient, air filtration systems must permit large volumes of air to flow through the filtering apparatus. Placing a filter element having an area equal to the area of the inspection hatch would not satisfy this requirement, particularly for a system where the air moving through it is moving at a high velocity, because the restriction of the filter element of the same area as the hatch opening is too great to pass the volume of air entering the storage unit. Further, the filtering element would tend to clog rapidly, diminishing its utility and lengthening the time needed to transfer the aggregate. Using a plurality of such elements in some arrangement would increase the filter area but require a bag house configuration—a separate structure to enclose and support the filter elements, a costly apparatus not well-suited to mobile apparatus, and one that further requires substantial installation and set up to place in operation. Further, since the bulk storage containers are typically large enclosures that may have multiple compartments, each such enclosure will have multiple inspection hatches, each requiring a filtering system. Thus, the solution needed is one that must be low in cost to manufacture and use, and readily adapted to the bulk storage containers without modification to their structure.

The solution described herein proposes a single air-permeable bag used as a dust screen, constructed of a suitable material and of appropriate size and weight. The dust screen may be placed over each inspection hatch of the storage unit enclosure or compartment, and held inflated in an upward direction by the high velocity air exhausting from the enclosure. As the air is exhausted, the dust, screened—i.e., separated from the air stream by the dust screen—is allowed to settle down into the enclosure or compartment with the frac sand aggregate conveyed into the storage unit. The bag must be large enough to provide sufficient surface area for the volume of air flowing into the storage compartment and through the permeable material. It must be light enough so that the air velocity through the inspection hatch is sufficient to extend the bag upward in a vertical orientation from the inspection hatch, in the passive air flow path at the rated air flow, to inflate the bag so that its full surface area is available to pass the volume of air while trapping the dust particles within it. The bag must be easily installed over the inspection hatch in keeping with the mobile nature of the equipment that must be transportable from site to site. Further, the bag must be easily removed during take down when operations are completed at a site and for cleaning for reuse.

In an advancement in the state of the art the present invention satisfies these requirements in a way (a) that utilizes the unique conditions of its intended use; (b) that requires no modification to the storage units; (c) requires no separate hopper or other container to collect the trapped dust, and provides these advantages and features in a way (d) not heretofore made available despite a long standing need to protect the health of workers at drilling sites using fracing technology from the effects of silica dust.

Some terms appearing in the description below are defined as follows. The active air stream refers to the high velocity air pumped from the pneumatic transport to convey the frac sand into the inlet of the storage unit. The passive air stream refers to the exhaust air stream that exits the storage unit through the inspection hatches. Configuring the passive air stream thus refers to opening the inspection hatches. A dust screen refers to a device that acts as a screen to separate air-borne particulate matter—i.e., dust—from the passive air stream that exhausts through the inspection hatch and the dust screen installed over the hatch.

The present invention provides a device for screening air-borne dust from the exhaust air during transfers of the frac sand or other aggregate from the pneumatic trailer or transport vehicle to the dry bulk storage unit. The dust screen device is configured as a sock or elongated bag formed of a porous fabric that may be secured over a vent or inspection hatch in the ceiling portion of a storage unit or tank. When the aggregate is being transferred or pumped from the pneumatic trailer into the compartment of a storage unit by air pressure, the installed dust screen will extend upward from the hatch to which it is attached, inflated by the air pressure created in the storage unit compartment by the high volume air flow from the pneumatic trailer. The dust screen, when so inflated, provides a large, uniform surface area that permits the high volume of air to exhaust through the air-permeable fabric to permit trapping as much silica dust and other particulate material as possible within the storage unit compartment. The screened material drops by gravity into the interior of the storage unit or is shaken from the fabric as the dust screen falls back through the hatch into the compartment when the air stream from the pneumatic trailer is stopped.

During development of the dust screen disclosed herein the total surface area of the elongated bag turned out to bear a specific relationship to the volume of air provided by the pneumatic trailer to transfer the aggregate into the storage unit. It was found that the surface area of the dust screen bag to be used with differences in the volume of air available from various pneumatic transport vehicles (also called a pneumatic trailer herein) is a ratio of the air flow from the pneumatic trailer to the air permeability rating of the fabric material used to construct the dust screen device. Applicant believes this useful parameter to be unique and became known only after working to understand the factors which determine the size of dust screen bag to provide the needed screening yet a dust screen bag that is also self-supporting, that is, does not require any additional structure to support the bag while in use. A self-supporting dust screen bag minimizes the cost. For example, it avoids the need to provide a collapsible or portable bag support structure in keeping with the need for a low cost, portable, easily installable dust screen device.

The dust screen includes the following components: an elongated bag formed of a fabric having a predetermined porosity and having an open end. A hem surrounds the open end of the elongated bag and an elastic band or cord is placed within the hem to urge temporary closure of the open end of the elongated bag around an inspection hatch. In addition, a binding strap, which preferably includes a ratchet buckle or similar tensioning device to tighten the strap, may be required in addition to the elastic hem to secure the open end of the elongated bag around the inspection hatch. In the illustrated embodiment the dust screen when inflated during use has a length (height) of approximately 62 inches and a nominal diameter of approximately 33 inches. This example is representative of the size and screening capacity in use with typical pneumatic trailers used for hauling and unloading aggregate materials.

An exemplary dust screen may be constructed from a polyester filter cloth woven from low-density synthetic yarn into a twill weave such as a 1/1 twill or a "plain weave" fabric. The dust screen may be sewn with a double needle lock stitch using size 138 bonded polyester UV inhibited thread for all seams. The elastic band or cord may be provided by a bungee cord or similar elastic rope or strap. A binding strap, which is recommended if the inspection hatch does not have a rim surrounding the hatch opening to retain the dust screen using the elastic hem, may be preferably equipped with a locking ratchet buckle or tensioning device to secure the strap around an inspection hatch upon which the dust sock is installed. The binding strap must be capable of exerting sufficient tension to securely hold the dust screen around the inspection hatch during transfer of the aggregate into the bulk storage unit.

When inflated by the passive (exhaust) air stream during loading of the aggregate into the storage unit, the height of the illustrated embodiment of the dust sock is approximately 62 inches above the hatch of the storage unit to which it is attached, and the nominal circumference, measured midway between the top and bottom of the dust sock is approximately 104 inches. The nominal diameter at that midway point in this example is approximately 33 inches. These numbers, which are approximate because the typical inspection hatch is square and the upper, closed end of the dust screen is merely the folded fabric, describe a dust screen or sock that provides a filter area of approximately 45 square feet that may be used with the high velocity air flow developed by the pneumatic pump on the transport vehicle of approximately 450 to 650 cubic feet per minute (CFM) in a typical installation.

DETAILED DESCRIPTION

In the following detailed description and drawings structural features identified with the same reference numbers are understood to represent the same structural element or feature. Although a single embodiment is illustrated and described to depict an example of the principles of the present invention, the features of the embodiment shown and described may be readily adapted in differing sizes, materials, or even particular applications without departing from the concepts depicted and described herein.

Figure 3:
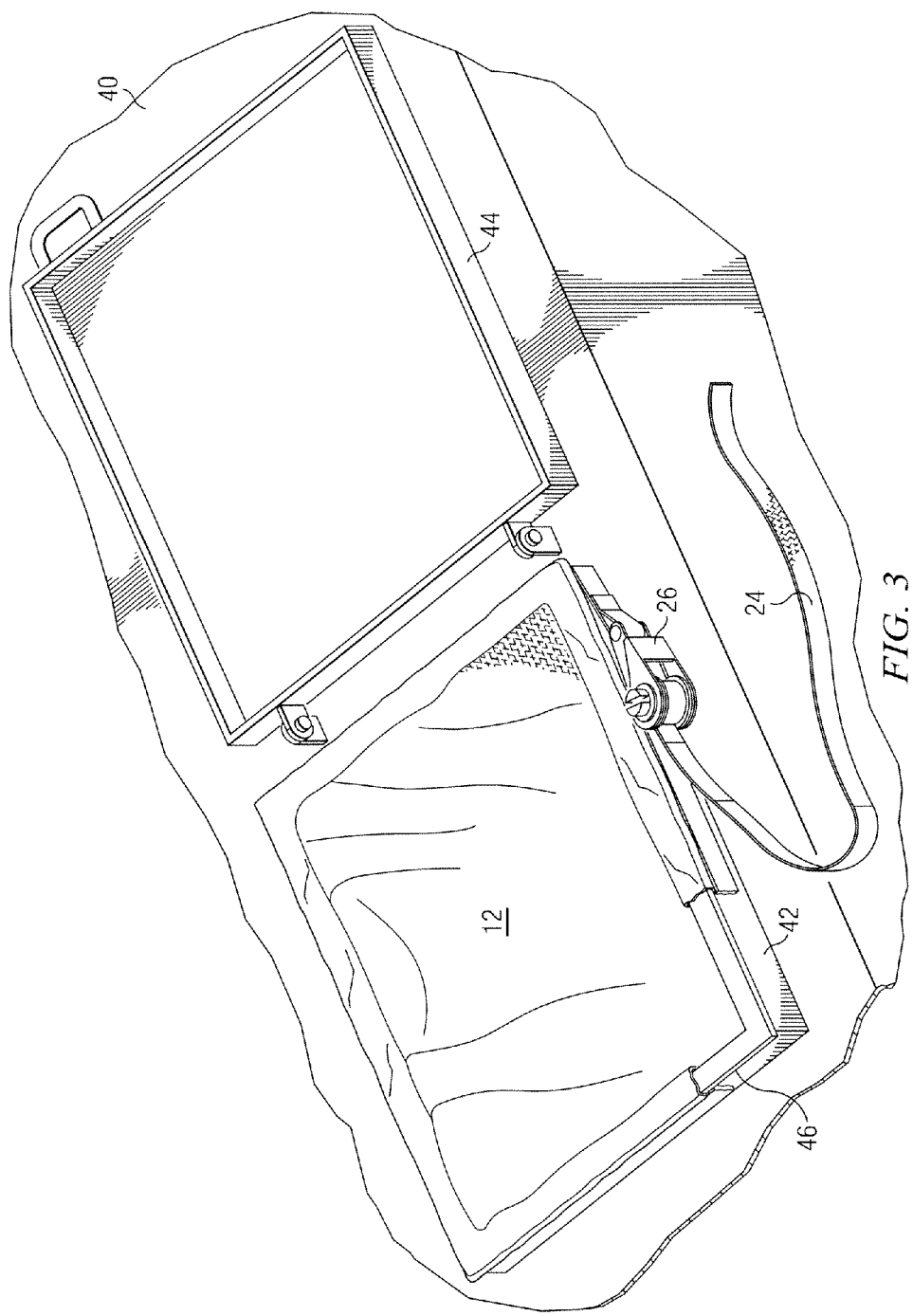
FIG. 3 illustrates an open hatch in a storage bin with the dust screen embodiment of FIG. 1 installed over the inspection hatch prior to pressurizing the storage bin to transfer aggregate thereto.

FIG. 1 illustrates one embodiment of a dust screen 10 device or attachment according to the present invention. The dust screen 10 is depicted as though it was fully inflated (see also FIG. 5) though not installed the inspection hatch 42 on a storage unit or bin 40 so that its structure may be described. As inflated, the dust screen 10 is configured to be oriented vertically such that the dust screen 10 is expanded to its full volume and surface area as it would be in operation. Dust screen 10 is formed as a bag 12 having a closed top end 14, an open bottom end 16, and a hem 18 that encloses an elastic cord or strap 20 (shown by dashed lines along hem 18) surrounding the open bottom end 16. The hem so configured is referred to herein as the hem 18, it being understood that it functions as an elastic hem. The open end 16 is shown opened with the elastic cord 20 stretched to the full circumference of the open end 16 to more clearly illustrate the structure. In practice, as will be described, the hem 18, when the dust screen 10 is installed around a hatch opening, the elastic cord 20 contracts to secure the hem 18 and the open end 16 of the dust screen 10 around the open inspection hatch 42. Shown surrounding the open end 16 just above the hem 18 is a retaining strap 24 equipped with a ratchet buckle 26 or other tensioning device for tightening the retaining strap 24 around the rim 46 of an inspection hatch 42 as shown in FIG. 3.

The dust screen 10 is preferably formed of a porous fabric 22 having a prescribed mesh. Reference number 22 thus represents a porous fabric material. As is well known, the term 'mesh' refers to a property of textiles or screens formed as a network of fibers having a corresponding regular pattern of interstices between the fibers of the network. The mesh of such material is usually associated with a known permeability to the flow of air through it, which is measured by a standard method. The mesh dimensions determine the size of air borne particles that will be trapped by the mesh structure of the textile or screen as air-borne particulate matter such as dust, for example, is caused to enter the dust screen. Generally, a porosity provided by a thread count for plain weave twill material having a thread count in the range of 60 to 76 threads per inch is suitable. In the illustrated embodiment, the preferred polyester twill material used has a thread count of 76×60 yarns per inch, a weight of 4.0 oz./sq. yd. (considered to be a low density material) and has an air-permeable rating—i.e., it will pass air through it—at the rate of 20 to 30 CFM (cubic feet per minute) at a condition of ½ inch (water column) pressure drop. It should be noted that the CFM rating refers to the cubic feet per minute flowing through each square foot of area of the material. This material provides the needed porosity for filtering or screening the dust while permitting sufficient air flow to inflate and extend the dust screen 10 fully upward, which is at once a principle requirement and attribute of the present invention. This attribute enables the dust screen 10 to be self-supporting; that is, no external or additional support for the dust screen 10 is needed, another feature of the present invention.

The thread count figure determines the size of dust particle that will be blocked by the porous fabric. The typical grain diameter of the frac sand is in the range of 0.0331" to 0.0165", which is equivalent to a "mesh numbers" of 20/40 respectively. This thread count will block substantially all of the dust particles>0.010" along with smaller particles that cling to the larger ones. The weight of the fabric in this example, 4.0 oz./yd.$^2$ is light enough to allow full inflation in a generally upward direction by an exhaust air flow of 20 to 30 CFM per square foot area of the dust screen. In other applications, particularly where the air volume pumped from the pneumatic trailer is in the range of approximately 600 CFM or higher, material of up to or exceeding 6.0 oz./yd.$^2$ may be suitable. Although the embodiment described herein is adapted to the pneumatic transfer of frac sand it will be recognized by persons skilled in the art that the principles of the present invention are adaptable to a wide range of processes involving the transfer of dry bulk aggregate matter having wide ranging sizes of particulate matter. Such processes may vary as to particle size, the air volume used to convey the aggregate, etc., requiring materials and construction that vary significantly from the illustrated embodiment.

To calculate the required area of the fabric for the dust screen, to a first approximation, the following formula is provided:

$$A = K(T_{CFM} \div F_{CFM}) \text{ in sq. ft. (ft}^2\text{)}$$

where:

$T_{CFM}$ is the CFM (cubic feet per minute) of the air stream produced by the transport vehicle;

$F_{CFM}$ is the air permeability of the fabric in CFM for a 0.5 inch (water column) pressure loss; and K is a dimensionless factor that relates the ability of the air stream to maintain the dust screen in an inflated condition. Typically this factor is defined by the inequality $1.0 < K < 5.0$. The ratio in this expression is the parameter mentioned earlier to define the relationship between the CFM capacity of the pneumatic trailer and the air permeability in CFM of the fabric needed for constructing the dust screen 10.

Figure 2:
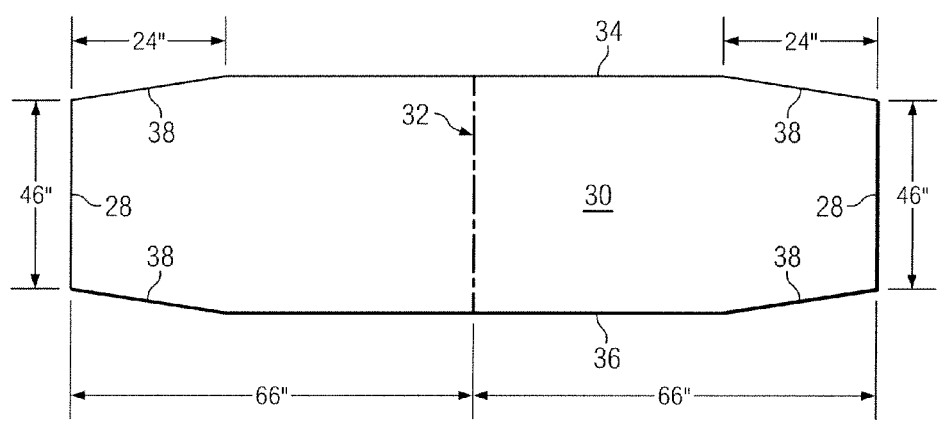
FIG. 2 illustrates a dimensional drawing of a fabric blank for forming the dust screen of FIG. 1.

In the illustrative example, let $K=2.5$, $T_{CFM}=450$ CFM, and $F_{CFM}=25$ CFM. Thus, $A=2.5 (450 \div 25)=45$ ft$^2$. FIG. 2 illustrates a fabric blank 30 cut to size to provide a dust screen having an area of approximately 45 ft$^2$.

FIG. 2 illustrates the blank 30 of air-permeable fabric for making the embodiment of FIG. 1. The fabric may be cut from a roll of the material that is 54 inches wide and 11.0 ft. long. $(54" \times 132") \div 144 \text{ in}^2 = 49.5 \text{ ft}^2$. The cut section is then folded in half at the midpoint 32 of its length and the ends 28 aligned. Next both sides of the folded blank 30 are trimmed at an angle such that the ends 28 are 46 inches wide and the sides 38 tapered to a full width of 54 inches of the fabric at a distance of 24 inches from the ends 28. This step will reduce the total area by approximately 1.33 ft$^2$. Further, allowing a 1.0 inch margin along both edges and a 2.0 inch margin along the open end of the bag on both sides for the elastic cord and hem, results in a reduction of the total area by approximately 4.4 ft$^2$, resulting in a total net area of 45.1 ft$^2$. The tapered lower end of the dust screen 10 enables a better fit to the dimensions of a typical inspection hatch 42 of the storage unit 40. The side edges 34, 36 are sewn together from the midpoint 32 to the ends 28 and the bag thus formed turned inside out to create the basic form of the dust screen. The seams along the side edges 34, 36 and the hem 18 may be sewn with a double needle lock stitch using size 138 bonded polyester UV inhibited thread. See FIG. 1.

The foregoing example is provided to illustrate one example of a dust screen 10 for an application whereby a pneumatic trailer 60 (See FIG. 6) pumps approximately 450 CFM through the conveyor conduit 76 (FIG. 6) to a storage unit 40 having two inspection hatches 42 of approximately 2.0 square feet area each, requiring a dust screen 10 installed over each inspection hatch 42. The pressure drop caused by the porous fabric 22 of the dust screen 10 (0.5 inch water column) at the rated CFM is negligible. The resulting area calculated above is sufficient to maintain both dust screens 10 inflated fully upward and present minimal restriction to the loading of the compartment 70 (FIG. 6) in the storage unit 40 that is connected to the conduit 76 from the pneumatic trailer 60. There are a number of variables involved, such as the number of hatches (typically there are two per compartment), the CFM rating of the pump 72 on the pneumatic trailer 60 (typically 450 to 650 CFM), and the combination of the air-permeability of the fabric selected, its mesh size, and the size of the dust particles it is necessary to trap within the dust screen 10. Persons skilled in the art will recognize that, beginning with the guidelines provided herein, only a small amount of routine experimentation may be required to arrive at a satisfactory design for a particular application.

Figure 4:
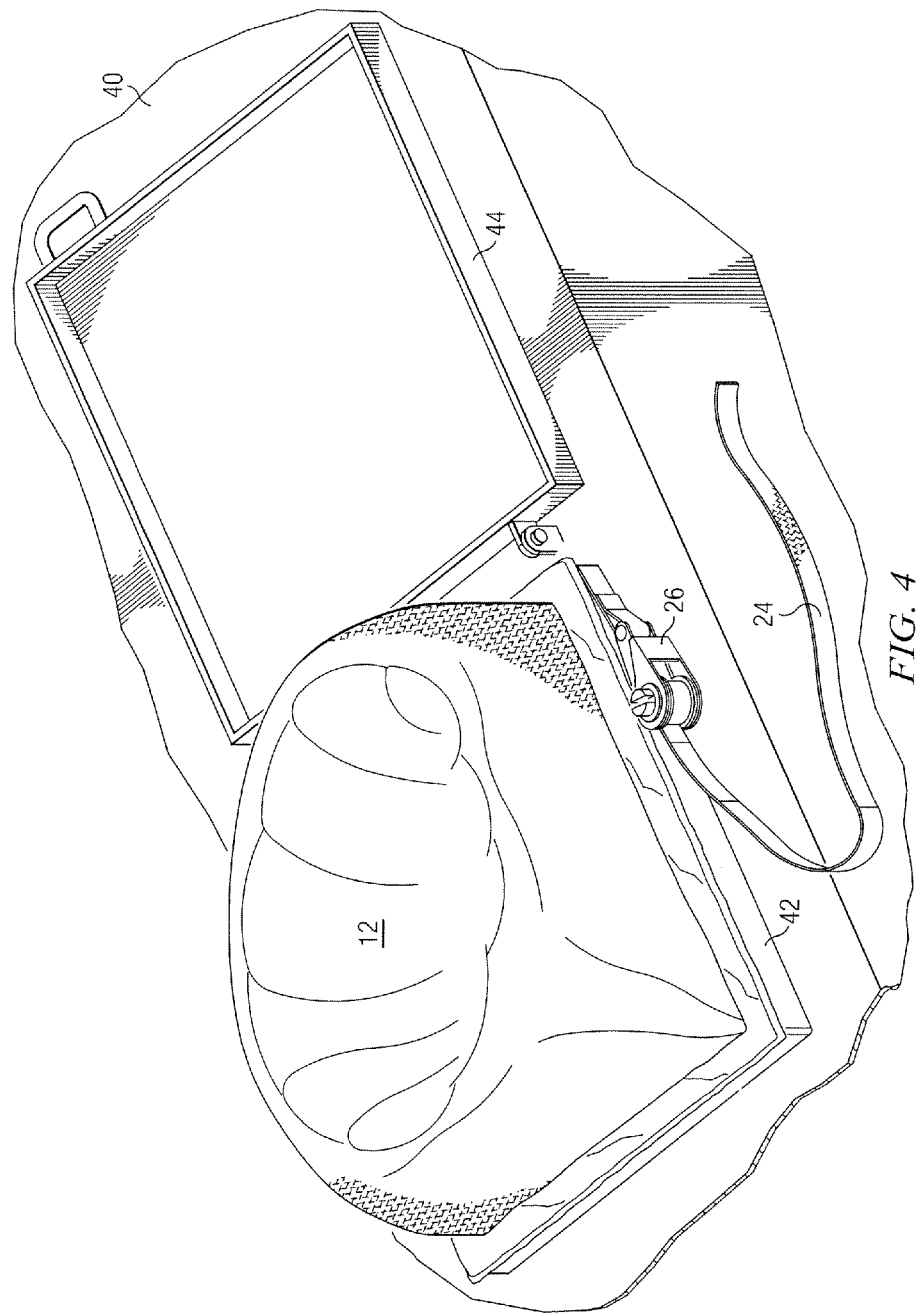
FIG. 4 illustrates the embodiment of FIGS. 1 and 2 with the dust screen partially inflated while pressurizing the storage bin to begin transferring aggregate into the storage bin.

FIG. 3 illustrates a cover 44 of an open inspection hatch 42 in a storage compartment 70 of a storage bin 40 with the dust screen 10 embodiment of FIG. 1 installed over the rim 46 of the inspection hatch 42 prior to pressurizing the storage bin compartment 70 to transfer aggregate thereto. As shown, without any air stream emitting from the hatch 42, the dust screen bag 12 is hanging limp downward within the storage bin 40. FIG. 4, like FIG. 3, also illustrates the embodiment of FIGS. 1 and 2 but with the dust screen 10 partially inflated in an intermediate position while the storage bin compartment 70 is just being pressurized to begin transferring aggregate into the storage bin 40.

Figure 5:
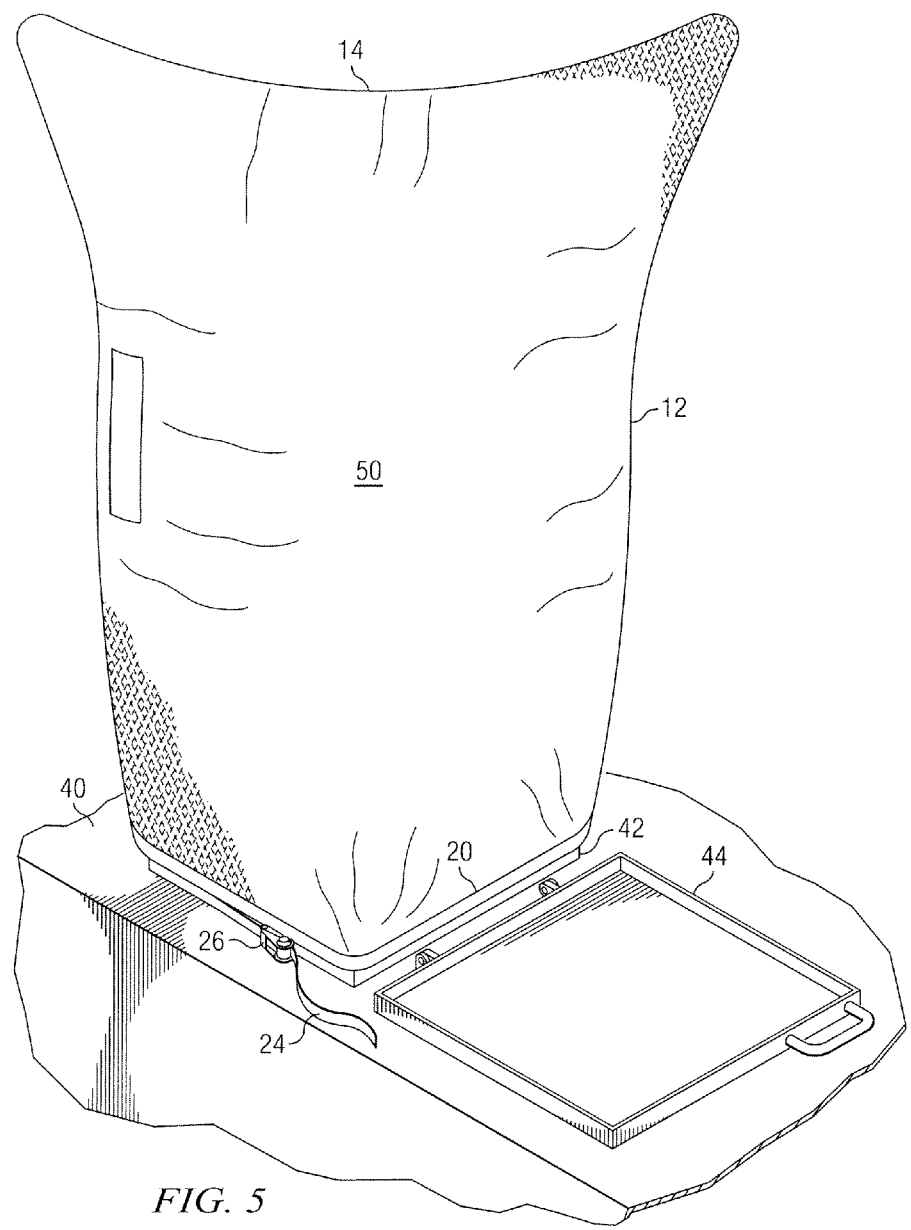
FIG. 5 illustrates the embodiment of FIGS. 1, 2, and 3 with the dust screen fully inflated over the inspection hatch during transfer of aggregate into the storage bin.

FIG. 5 illustrates the embodiment of FIGS. 1, 3 and 4 with the dust screen 10 fully inflated over the inspection hatch 42 during transfer of aggregate into the storage compartment 70 of the storage bin 40.

Figure 6:
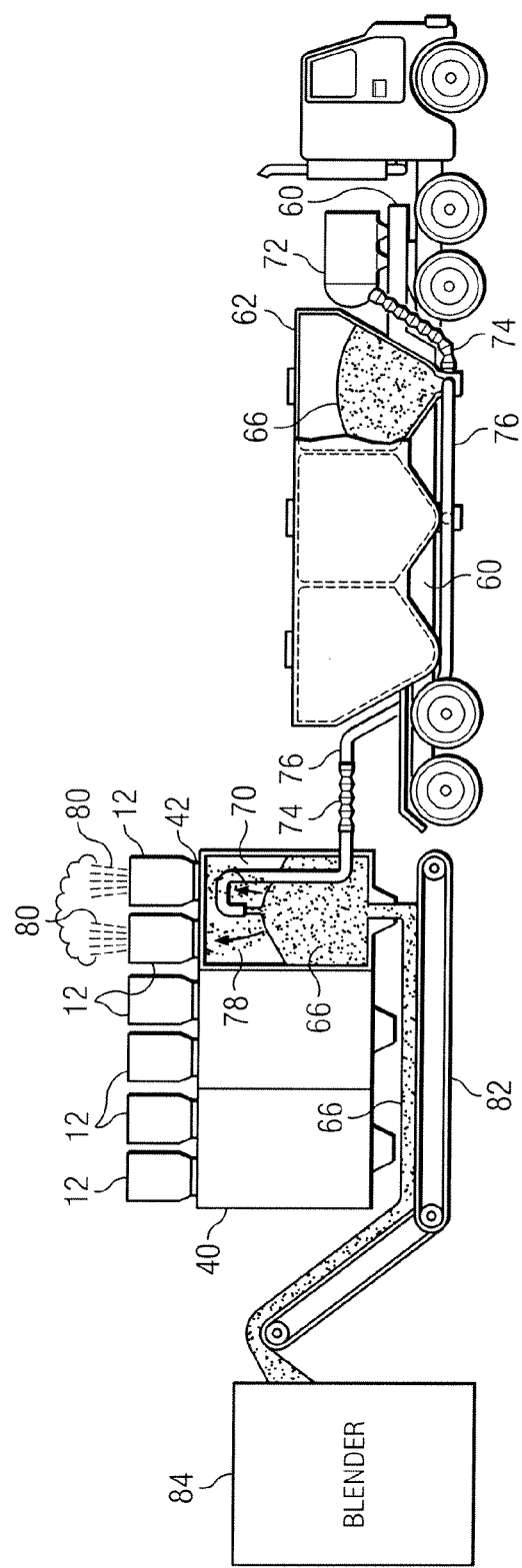
FIG. 6 illustrates a side view of a typical use of the embodiment of FIGS. 1, 3, 4 and 5.

FIG. 6 illustrates a side view of a typical use of the dust screen 10 shown in FIGS. 1, 3, 4 and 5. This view depicts a storage unit 40 being loaded with frac sand 66 pumped from a compartment or hopper 62 of a pneumatic trailer 60 into one storage compartment 70 of the storage unit 40. The pneumatic trailer 60 is not part of the invention and is well-known in the art so will not be described herein. In this illustration, the storage unit 40 has three storage compartments 70 and two inspection hatches 42 for each storage compartment 70, each inspection hatch being equipped with a dust screen 12 according to the present invention. Frac sand 66 in the pneumatic trailer 60 drains from a hopper 62 into a conveyor duct 76 where it enters a high volume stream of air pumped by a pneumatic pump 72 situated on the pneumatic trailer 60. The pneumatic pump 72 is connected to the conveyor duct 76 by a flexible duct segment 74. Another flexible duct segment connects the conveyor duct 76 to the duct that enters the storage compartment 70. As the frac sand 66 is deposited in the storage compartment 70, the dust 78 that accompanied the frac sand 66 is conveyed upward through the inspection hatch 42. Much of the dust, being air-borne, is blown into the dust screens 12, where it is retained by the dust screens 12 and allowed to settle into the storage compartment 70. The exhaust air stream 80, free of the dust 66 it conveyed into the storage compartment 70, emerges through the permeable fabric of the dust screens 12 into the surrounding atmosphere. The stored frac sand 66 or other dry bulk aggregate remains in the storage unit 40 until time to convey it to a mixing or blending apparatus for mixing with water and other chemicals to produce the desired fracing fluid recipe.

To summarize, a dust screen device or bag (also called a dust sock herein) is placed over an open inspection hatch and secured thereto. As mentioned previously, dry bulk storage units are used on oil and gas drilling sites to store dry bulk aggregate such as frac sand. In one example, dry frac sand of a select grade is used as an ingredient in hydraulic fracturing processes employed in opening passages in shale strata for releasing petroleum and natural gas deposits bound within the shale strata. The aggregate is typically loaded into the storage bins from pneumatic trailers used to transport the aggregate to the drilling site. When secured in the passive (or exhaust) air flow path at the inspection hatch of a storage compartment of a dry bulk storage unit the dust screen device described herein is configured to inflate upward due to the high velocity exhaust air stream emitted from the storage compartment and trap the dust particles within the dust screen, allowing them to settle back into the storage compartment. No separate hopper or other container is required. No additional support for the dust screen is required. The device is light weight, portable, easily installed and removed, and low in cost, yet effectively removes the dust from the passive exhaust air stream used to convey the aggregate from the transport vehicle to the storage unit. It is also reusable and easily rolled up or folded for storage or transport.

While the invention has been shown in only one of its forms, it is not thus limited but is susceptible to various changes and modifications without departing from the spirit thereof. For example, although the embodiment described herein is adapted to the pneumatic transfer of frac sand it will be recognized by persons skilled in the art that the principles of the present invention are adaptable to a range of similar processes involving the pneumatic transfer of dry bulk aggregate matter. The dry bulk aggregate may have very different particle sizes, or the air volume used to convey the aggregate may be quite different, or the storage unit may be constructed differently, etc., requiring materials and construction of the dust screen device that vary significantly from the illustrated embodiment.

What is claimed is:

1. A dust screen for a topside inspection hatch of a dry bulk storage unit, for use during pneumatic transfer of frac sand from a transport vehicle via an active air stream inlet to said storage unit, comprising:
    a bag open at a first end and formed of a low density twill fabric having a rated air permeability between 15 and 35 CFM;
    said bag further having a net surface area in square feet exceeding the ratio of the pneumatic capacity of the transport vehicle in CFM to the rated air permeability of said dust screen in CFM; and
    an elastic band disposed within a sewn hem surrounding said open first end of said bag to attach said open end of said elongated bag around and in contact with a rim of said inspection hatch; wherein
    said dust screen, installed over said topside inspection hatch, is configured to inflate upward from said hatch to expose the full area of said dust screen to air exhausting from said hatch while retaining air-borne dust particles within said dust screen such that they settle into said storage unit, wherein no separate container is required to collect said dust particles.

2. The dust screen of claim 1, further comprising:
    a binding strap having a ratchet buckle, said binding strap attached around said bag along said hem at said open end of said bag for securing said open end of said bag around said rim of said inspection hatch.

3. The dust screen of claim 2, wherein said binding strap comprises:
    a woven strap having a predetermined strength in tension exceeding 200 pounds; and
    a ratchet buckle for securing said strap in tension around said open end of said bag and said rim of said hatch.

4. The dust screen of claim 1, said bag further comprising:
    an elongated tubular form constructed of polyester filter cloth woven from low density yarn in a twill weave; and
    seams sewn double stitched with bonded polyester UV-inhibited thread.

5. The dust screen of claim 1, said bag further comprising:
a net surface area in square feet exceeding the ratio of the pneumatic capacity of the transport vehicle in CFM to the rated air permeability of said dust screen in CFM multiplied by a factor K, where $1.0 \leq K \leq 5.0$.

6. The dust screen of claim 1, wherein said low density twill fabric comprises:
a plain weave twill having a density of less than 6.0 oz./yd.$^2$.

7. The dust screen of claim 1, wherein said elastic band comprises:
a length of elastic cord or strap sufficient to contract said open end of said bag to the circumference of said inspection hatch of said dry bulk storage unit.

8. The dust screen of claim 1, wherein:
no support structure for supporting the dust screen in a vertical orientation above the inspection hatch is required while said aggregate is being transferred into said bulk storage unit.

9. The dust screen of claim 1, wherein:
the number of such dust screens per storage unit compartment is determined by the dust screen surface area needed to pass the net cubic feet per minute air flow input to said storage unit from said pneumatic transport used to convey said aggregate into said storage unit.

10. A method for retaining air-borne dust within a bulk storage unit for aggregate material during pneumatic transfer of said aggregate into said storage unit at an inlet of said storage unit defined as an active air path, comprising the steps of:
configuring an inspection hatch disposed in a ceiling of said storage unit as a passive path for exhaust air flow;
forming a dust screen as an elongated bag formed of a low density twill fabric having a rated air permeability between 15 and 35 CFM and having a net surface area in square feet exceeding the ratio of the pneumatic capacity of the transport vehicle in CFM to the rated air permeability of said dust screen in CFM;
providing said dust screen with an open first end surrounded by an elastic hem;
attaching said dust screen over said inspection hatch using said elastic hem;
exhausting said pneumatic air flow upward through said inspection hatch and said dust screen; and
depositing said particles of air-borne dust retained within said dust screen into said bulk storage unit.

11. The method of claim 10, wherein the step of configuring comprises the step of:
opening the inspection hatch.

12. The method of claim 10, wherein the step of forming comprises the step of:
selecting a plain weave twill of polyester yarn having a density of less than 6.0 oz./yd.$^2$ and a thread count exceeding 60×60 yarns per inch.

13. The method of claim 10, wherein the step of forming further comprises the step of:
setting the net surface area of the dust screen in square feet to exceed the ratio of the pneumatic capacity of the transport vehicle in CFM to the rated air permeability of said dust screen in CFM multiplied by a factor K, where $1.0 \leq K \leq 5.0$.

14. The method of claim 10, wherein the step of forming further comprises the step of:
enclosing within said hem a length of elastic cord or strap sufficient to contract said open end of said bag to the circumference of said inspection hatch of said dry bulk storage unit.

15. The method of claim 10, wherein the step of attaching comprises the step of:
securing said open end of said dust screen to said inspection hatch using a binding strap around said open end tightened by a tensioning device.

16. The method of claim 10, wherein the step of exhausting comprises the step of:
causing said dust screen to inflate and extend upward from said hatch, releasing said air into the surrounding atmosphere while causing said particles of air-borne dust to settle by gravity and be retained within said storage unit.

* * * * *